(12) United States Patent
Stubrin (10) Patent No.: US 12,402,745 B2
(45) Date of Patent: Sep. 2, 2025

(54) INFUSER AND SYSTEM FOR PREPARING AN INFUSED BEVERAGE

(71) Applicant: Marcos Eduardo Stubrin, Saavedra (AR)

(72) Inventor: Marcos Eduardo Stubrin, Saavedra (AR)

(73) Assignee: Marcos Eduardo Stubrin, Santa Fe (AR)

( * ) Notice: Subject to any disclaimer, the term of this patent is extended or adjusted under 35 U.S.C. 154(b) by 653 days.

(21) Appl. No.: 17/782,585

(22) PCT Filed: Dec. 2, 2020

(86) PCT No.: PCT/IB2020/061408
§ 371 (c)(1),
(2) Date: Jun. 3, 2022

(87) PCT Pub. No.: WO2021/111343
PCT Pub. Date: Jun. 10, 2021

(65) Prior Publication Data
US 2023/0010774 A1    Jan. 12, 2023

Related U.S. Application Data

(60) Provisional application No. 62/942,908, filed on Dec. 3, 2019.

(51) Int. Cl.
| A47J 31/20 | (2006.01) |
| A47G 19/16 | (2006.01) |
| A47J 31/06 | (2006.01) |

(52) U.S. Cl.
CPC .............. *A47J 31/20* (2013.01); *A47G 19/16* (2013.01); *A47J 31/06* (2013.01)

(58) Field of Classification Search
None
See application file for complete search history.

(56) References Cited

U.S. PATENT DOCUMENTS

| 1,254,115 | A | 1/1918 | Brand |
| 6,142,384 | A | 11/2000 | Shafik |
| 7,337,705 | B1 | 3/2008 | Catena et al. |
| 2008/0305226 | A1* | 12/2008 | Catena .................. A47J 31/20 |
| | | | 426/431 |
| 2010/0159075 | A1 | 6/2010 | Baron |
| 2016/0262565 | A1* | 9/2016 | Beckman ............. A47J 31/005 |
| 2021/0093100 | A1* | 4/2021 | Ewing .................. A47F 1/128 |

FOREIGN PATENT DOCUMENTS

| AR | 025299 A1 | 11/2002 | |
| DE | 9016740 U1 * | 4/1991 | ............. A47G 19/16 |
| EP | 0173492 A1 | 3/1986 | |
| FR | 3088003 A1 | 5/2020 | |
| GB | 2214785 A * | 9/1989 | ............. A47G 19/16 |
| WO | WO88/03367 A1 | 5/1988 | |

* cited by examiner

*Primary Examiner* — John J Norton
(74) *Attorney, Agent, or Firm* — Muncy, Geissler, Olds & Lowe, P.C.

(57) ABSTRACT

An infuser and a system for preparing an infused beverage in a drinking cup. The infuser comprises a hollow cylinder comprising a plurality of orifices, an inner cavity, an opening in a top surface, a filter element and a threaded bottom portion. The system comprises a container, the infuser and a drinking straw. The system can be used with "single-serve" ingredients to be infused, in particular based on yerba mate, coffee or tea.

7 Claims, 11 Drawing Sheets

INFUSER AND SYSTEM FOR PREPARING AN INFUSED BEVERAGE

FIELD OF THE INVENTION

The present invention relates to a system for preparing an infused beverage. More specifically, the present invention relates to an infuser, a system comprising a container, an infuser and a drinking straw. The infuser and system of the present invention can be used to prepare and drink a flavorful yerba mate, tea or coffee infusion.

BACKGROUND

Yerba mate (*Ilex paraguariensis*) is a plant species used to prepare an infused beverage commonly referred to as "mate" in Spanish and Portuguese and eventually written as "maté" in English and French, along with other beverages based on yerba mate.

Mate is traditionally consumed in central and southern regions of South America, primarily in Argentina, Uruguay and Paraguay, as well as in southern and central-western Brazil, the Chaco region of Bolivia and southern Chile. It is also popular in the Druze community in Syria and Lebanon.

Yerba mate is also an ingredient in several energy drinks and is commonly sold as a bottled or canned iced tea. It contains several ingredients such as polyphenols, xanthines and minerals, which make it attractive to the health food market.

For personal consumption, the infusion is traditionally prepared by filling a container, typically a gourd—the gourd itself called "mate"—, up to three-quarters full with dry leaves and twigs of the yerba mate plant, and filling it up with water at a temperature of 70-85° C. or with cold water in the case of "tereré". This process is termed "cebado" or brewing of the mate. The drink is consumed using a metal straw having a filter at its bottom or "bombilla". Once the container is empty of liquid, it is refilled with fresh water. A single load of yerba mate can be used for several refills, although the infusion becomes more diluted with each successive refill.

The process of cebado largely determines the flavor of the obtained infusion and the amount of refills that can be performed with a single yerba mate load. It is recommended that the yerba mate be placed inside the container such that only a fraction of the yerba mate comes in contact with fresh water during each individual refill. Moreover, the free surface of the yerba mate should be at an angle with respect to a horizontal plane, the water should be poured slowly and opposite to the spot where the bombilla is introduced, and several other conditions are to be met. This makes the process of cebado manually complex and results in a high probability of a "watered-down" infusion ("mate lavado"), meaning the flavoring ingredients, as well as other nutrients present in the yerba mate, are not adequately transported to the water used for the infusion. It can also result in a drink that is initially very concentrated and bitter tasting, but that is quickly washed down after about two refills.

Devices and systems to prepare infused beverages are generally known in the patent literature.

Patent U.S. Pat. No. 1,254,115 A describes the combination of a drinking straw and a container, wherein the container is adapted for containing fruit extracts, liquors, powders, crystals, or other refreshment commodities, and has its ends sealed by detachable closures. When the closures are removed, the ingredient can be released to a drinking vessel and diluted with water.

International patent application WO 88/03367 A1 discloses a method and apparatus for making an infusion, based on the development of hydrostatic pressure to ensure adequate brewing of the ingredients to be infused, such as coffee beans, tea leaves or cocoa powder.

Patent application US 2010/0159075 A1 relates to a flavoring drinking straw, in which pellets of an active ingredient are dissolved upon consumption to obtain an infused beverage.

None of the aforementioned inventions could be used to prepare a flavorful yerba mate infusion, since they would not provide an adequate amount of yerba mate in contact with a given volume of water.

Furthermore, the available systems adapted for yerba mate infusions require either the manipulation of yerba mate during brewing or a manual brewing of the mate.

The "self-brewing" mate or "self-cleaning" mate is a system comprising a drinking cup and a drinking straw, based on the suction or pumping of the liquid. These alternatives do not avoid the manipulation of yerba mate by the user.

Patent application AR 025299 A1 discloses a disposable system for preparing a mate comprising a drinking straw, where the user must pour water directly onto the yerba mate.

The commercially available product Matelim® provides a system to prepare mate consisting of a plastic bag placed inside the mate gourd, in which manipulation and contact with the yerba mate is avoided, but the user must adequately brew the mate to enjoy a fully flavored drink.

There is therefore a need to provide an infuser, as well as a system for preparing an infused beverage without the shortcomings of the prior art relating to manipulation of yerba mate. In particular, there is a need to provide a simple system for the infusion of yerba mate without the need of manually brewing the yerba mate that still provides a flavorful infusion and an enjoyable drinking experience.

SUMMARY OF THE INVENTION

The present invention provides clean, disposable, environmentally friendly and easy-to-use systems for preparing an infused beverage that can be easily transported. This allows a user to prepare a flavorful mate drink outside their home, for example during travels, public events and the like, without having to manually manipulate plastic bags or yerba mate bundles during brewing.

In a First Aspect, the Present Invention Provides an Infuser Comprising:
- a hollow cylinder comprising a plurality of orifices at a cylindrical lateral surface,
- an inner cavity for containing an ingredient to be infused,
- an opening in a top surface for attaching a drinking straw,
- a filter element for separating the ingredient to be infused from the drinking straw,
- a threaded bottom portion for attaching a bottom cover.

In a preferred embodiment, the diameter of the orifices is between 0.3 mm and 1.5 mm.

Preferably, the ratio of the number of orifices to the diameter of each orifice is in the range of 60 to 650 $mm^{-1}$.

In an embodiment, the ingredient to be infused is yerba mate or coffee and the diameter of the orifices is between 0.3 mm and 0.7 mm.

In another embodiment, the ingredient to be infused is tea and the diameter of the orifices is between 1.0 mm and 1.5 mm.

In yet another embodiment, the infuser further comprises three sections defined by an angle of 120°, wherein a first section has orifices of a diameter between 0.3 mm and 0.5 mm, a second section has orifices of a diameter between 1.3 mm and 1.5 mm and a third section is devoid of orifices and a movable lid for selectively covering two of the first, second and third sections.

In a second aspect, the present invention provides a system for preparing an infused beverage, the system comprising:

an infuser according to the first aspect of the present invention, a double-walled cylindrical container, the infuser being located in a bottom portion of the container, an top cover comprising a mouthpiece attached to an upper end of the cylindrical container, a drinking straw attached to the opening of the infuser, the straw being in fluid communication with the mouthpiece, a bottom cover attached to the threaded bottom portion of the container.

BRIEF DESCRIPTION OF THE DRAWINGS

The appended figures are schematic views of preferred embodiments of the present invention. They are illustrative and not intended to limit the scope of the claims.

DETAILED DESCRIPTION

The invention will now be described in further detail with reference to the appended drawings.

Figure 1:
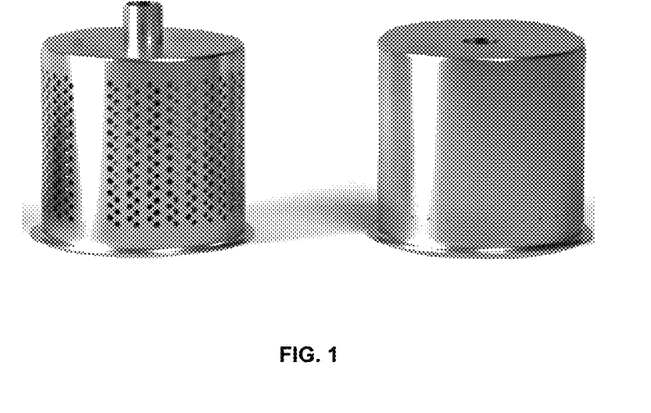
FIG. 1 shows a schematic representation of the infuser of the present invention with orifices for "tea/water mode" (left) and "mate/coffee mode" (right).

FIG. 1 shows the infuser of the invention, which can be configured in different drinking modes, such as a "mate/coffee mode" and a "tea/water mode", by adapting the diameter, number and distribution of orifices in a lateral infuser surface, as will be described in further detail below. FIG. 1 shows in infuser configured for the "tea/water mode" on the left-hand side and an infuser configured for the "mate/coffee mode".

Figure 2:
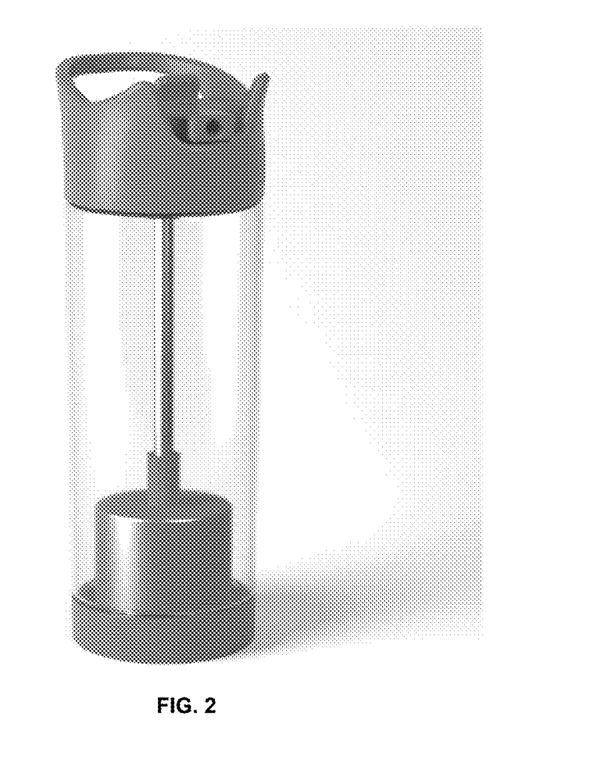
FIG. 2 shows a schematic representation of the system for preparing an infused beverage according to an embodiment, wherein the infuser comprises orifices for "mate/coffee mode".
Figure 3:
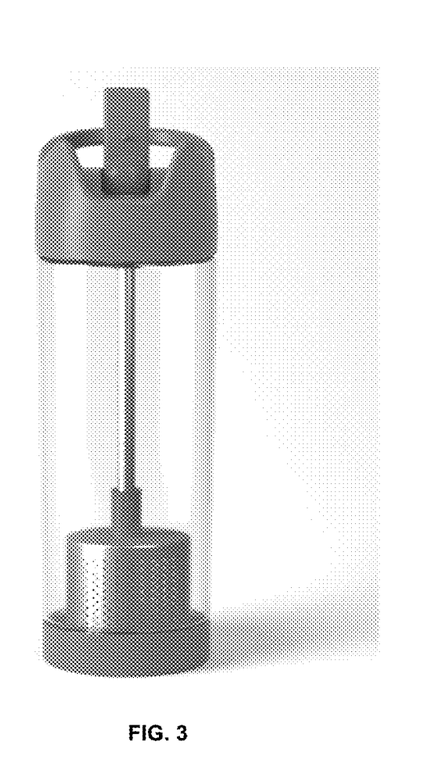
FIG. 3 shows a side view of the system for preparing an infused beverage according to an embodiment, wherein the infuser comprises orifices for "tea/water mode".
Figure 4:
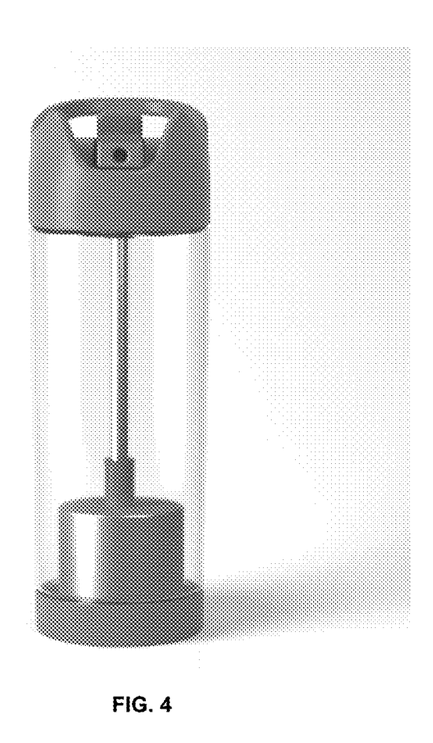
FIG. 4 shows a side view of the system for preparing an infused beverage according to an embodiment, wherein the infuser comprises orifices for "mate/coffee mode".

As seen in FIG. 2, the system of the present invention comprises an infuser and a drinking straw, wherein the infuser is placed inside a container or bottle and the drinking straw passes through a top cover of the container is in fluid communication with a mouthpiece from which a user can drink the prepared infused beverage.

The infuser comprises an inner cavity for containing the ingredient to be infused.

The ingredient to be infused may be in the form of a powder, crushed or divided leaves, flowers, roots, barks, vines, shrubs, fruits, seeds or sticks of different herbs or plants, such as tea, coffee or mate plants.

Alternatively, the infuser and system of present invention may be used with "single-serve" pods comprising the ingredient to be infused, such as any variety of yerba, tea, ground coffee and in general leaves, flowers and fruits. The pods may be obtained by compressing herbs or other ingredients into a tablet or briquette, e.g. by applying mechanical pressure. The pod is placed inside the inner cavity of the infuser and will progressively come loose as the infusion fluid flows into the inside of the inner cavity, thereby releasing the ingredients to be infused into the infusion fluid.

The infuser further comprises a threaded portion for attaching a bottom cover when used in the system of the present invention. In this system of the present invention, the ingredient to be infused may be placed inside the infuser after removing the bottom cover.

The infuser may be manufactured in any water-resistant material. For example, the infuser might be made of stainless steel, preferably SAE 304 stainless steel. The lateral orifices can be perforated using a drill adapted for microperforations. In the system for preparing an infused beverage, the infuser is located inside the bottle, preferably in a bottom section of the bottle.

The container or bottle is double-walled and manufactured in a material that provides thermal insulation, such as a polypropylene, stainless steel or glass, particularly borosilicate glass.

The infuser has a substantially cylindrical shape. In a preferred embodiment, the diameter of the infuser is of approximately 45 mm.

The drinking straw is attached to the infuser by fitting the straw into an opening practiced in a top surface of the infuser. A sealing element or gasket, such as an O-ring, may be provided to ensure a tight contact between the infuser and the drinking straw.

A filtering element is further provided in the infuser, preferably in the opening of the top surface of the infuser, to avoid the ingredient to be infused being carried into the drinking straw by the flow of infusion fluid. Preferably, the filtering element is a mesh or a grid.

In a preferred embodiment, the drinking straw is a hollow cylinder of approximately 60 mm in length and a thickness of approximately 1.5 mm. The outer diameter of the drinking straw is approximately 7 mm.

The drinking straw may be made of any durable material, such as stainless steel or nickel steel. Cleaning the drinking straw with a gentle cleanser such as soap, e.g. by using a brush is the only maintenance step required.

Figure 5:
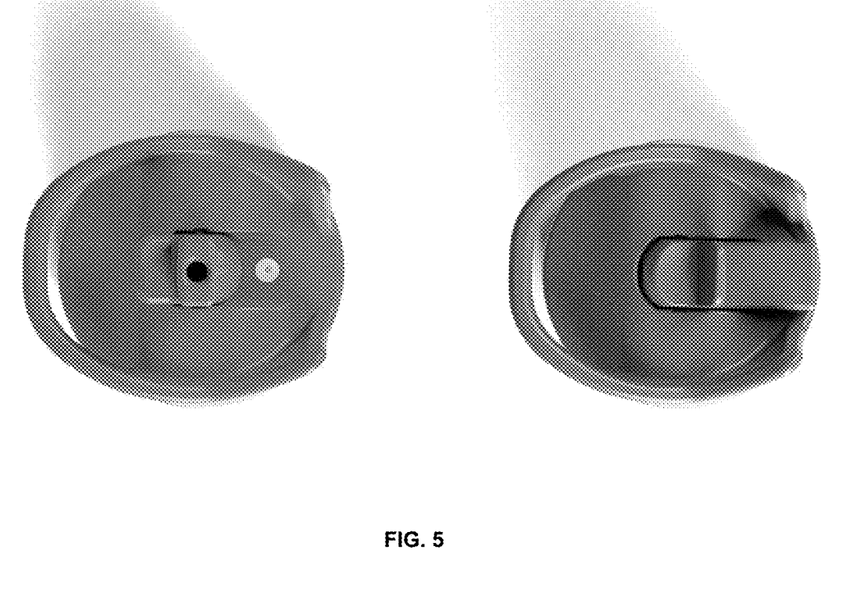
FIG. 5 shows a top view of the cover of the system for preparing an infused beverage according to an embodiment with the mouthpiece open (left) and closed (right).

The top cover, as shown in FIG. 5, and the lower cover, can be made of a thermoplastic material, such as polypropylene. This material provides adequate thermal insulation, reducing losses due to heat conduction, convection and evaporative cooling. Similarly, to the lower cover, the top cover is coupled to the bottle by a threaded joint.

The top cover may be further provided with an orifice for relieving the pressure exerted by steam evaporated from the warm infusion fluid, as seen on the left-hand side of FIG. 5, i.e. when the mouthpiece is in an "open" or "drinking" position.

The top cover is provided with a mouthpiece in fluid communication with the drinking straw. In the system of the present invention, the mouthpiece is attached to the top cover and can rotate with respect to the surface of the top cover from a pivotal axis. The mouthpiece may be of the same material as the cover, of the same material as the drinking straw, such as stainless steel.

To prepare an infusion using the system of the present invention, the bottle is filled with infusion fluid, while the infuser contains an ingredient to be infused. Infusion fluid may be poured into the bottle after removing the bottom cover, thereby also detaching the drinking straw from the infuser.

Figure 6:
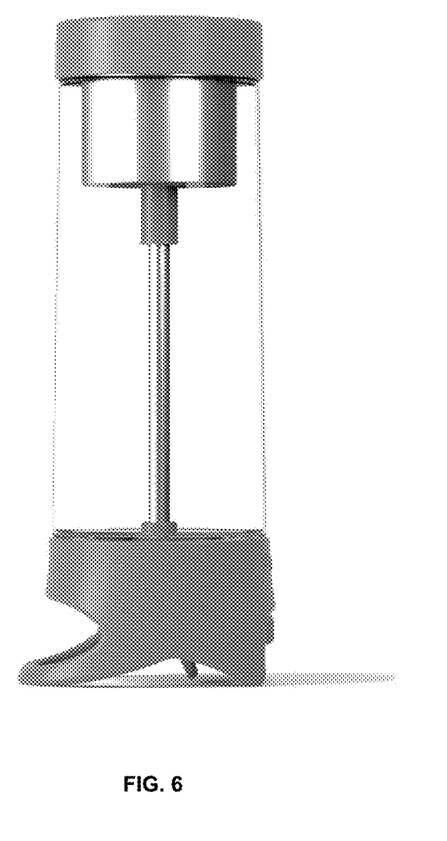
FIG. 6 shows a side view of the system for preparing an infused beverage according to an embodiment, wherein the system is placed upside/down for filling it with infusion fluid.
Figure 7:
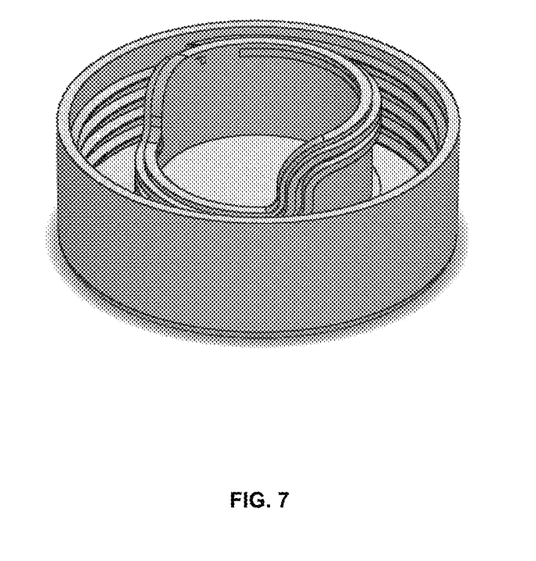
FIG. 7 shows a top view of the movable lid for using with the infuser according to an embodiment, wherein the movable lid is attached to the bottom cover.
Figure 8:
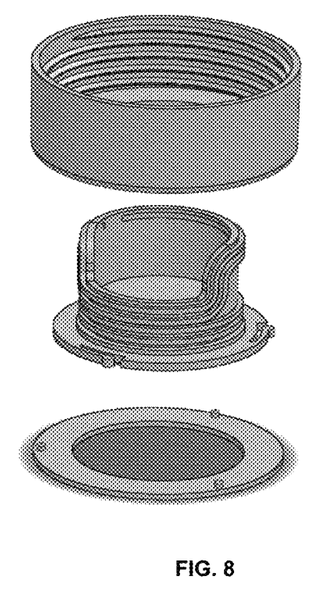
FIG. 8 shows an exploded top view of the movable lid for using with the infuser and according to an embodiment, wherein the movable lid is attached to the bottom cover.
Figure 9:
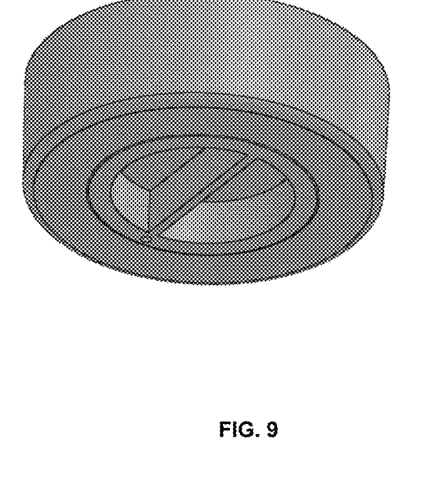
FIG. 9 shows a bottom view of the movable lid for using with the infuser according to an embodiment, wherein the movable lid is attached to the bottom cover.
Figure 10:
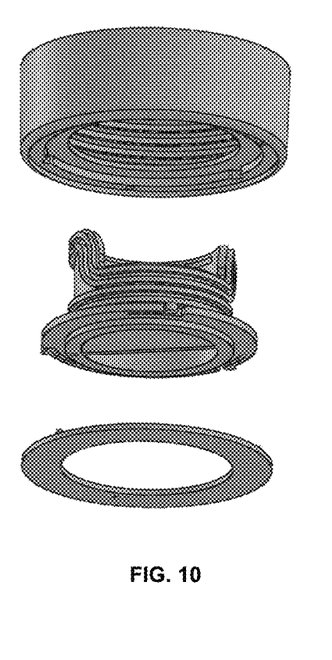
FIG. 10 shows an exploded bottom view of the movable lid for using with the infuser according to an embodiment, wherein the movable lid is attached to the bottom cover.

As seen in FIG. 6, the system may be advantageously placed upside-down in order to ease the filling with infusion fluid. To this end, the top cover may be formed to provide a support for the weight of the system.

The infusion fluid, generally water, may be cold, lukewarm or warm, with temperatures preferably ranging from 5 to 100° C. In the case of preparing a mate infusion, the optimal temperature is in the range of about 70 to 85° C. Other preparations based on yerba mate, such as tereré can be prepared with water or fruit juice at lower temperatures.

As the user creates suction using the mouthpiece, a vacuum of about 3 kPa is generated between the infusion fluid in contact with the infuser and the mouth of the user. As a result, infusion fluid flows through the orifices in the infuser and into the inner cavity, thereby coming in contact with the ingredient to be infused. The volume of the inner cavity is designed such that the residence time of the infusion fluid allows for an adequate infusion, resulting in a flavorful and well-rounded drinking experience. The infused fluid then flows upwards through the drinking straw and reaches the user through the mouthpiece connected to the drinking straw.

For preparing a mate infusion, the amount of yerba mate inside the inner cavity is determined to yield about 380 cm³ of mate. In a preferred embodiment, the amount of yerba mate inside the inner cavity is approximately 16 g.

The infusion fluid is allowed to flow inside the inner cavity of the infuser trough the orifices provided at the infuser lateral surface, i.e. a cylindrical surface. The smaller the diameter of the orifices, the more resistance to liquid flow will be encountered by the user when suctioning at mouthpiece connected to the drinking straw. At the same time, if the diameter of the orifices is too large, the flow might not be unidirectional, which will be detrimental to the quality and flavor of the infusion.

In a preferred embodiment, the diameter of the infuser orifices is between 0.3 mm to 1.5 mm, depending on the ingredient to be infused, to ensure an adequate flavor development and a proper infusion flow rate.

When the ingredient to be infused is yerba mate or coffee, it was found that the diameter of the infuser orifices to allow a proper infusion is between 0.3 mm and 0.5 mm. In the case of tea, the diameter is between 1.2 mm and 1.5 mm.

The number of orifices in the infuser may be adapted for the ingredient to be infused, depending on the size of the crushed herbs/leaves/grains and the solubility of its flavor agents in the infusion fluid. It was found that a greater number of orifices of a greater diameter was adequate for the "tea/water" mode, while a lower number was more adequate for the "mate/coffee mode". Further, the distribution of the orifices may be adapted for the ingredient to be infused, as will be explained below.

It was also found that the number of orifices in the infuser is related to the diameter of each of the orifices by a ratio in the range of 60 to 650 mm$^{-1}$, preferably about 60 to 150 mm$^{-1}$ when yerba mate or coffee are the ingredient to be infused, and about 200 to 450 mm$^{-1}$ when tea is the ingredient to be infused.

The flow through each of the lateral orifices of the infuser can be considered laminar, and therefore adequately modeled by the Hagen-Poiseuille equation:

$$\dot{Q} = \frac{\pi \Delta p R^4}{8 \mu L}$$

wherein $\dot{Q}$ is the volumetric flow rate of infusion fluid (in m³/s), $\Delta p$ is the pressure drop through the orifice in the lateral surface of the infuser (in Pa), $\mu$ is the infusion fluid viscosity (in Pa·s), R is the orifice radius and L the orifice length (both in m).

If the value of $\dot{Q}$ is too small, the amount of ingredient to be infused that will be in contact with infusion fluid in a given amount of time will be low, which is desirable in the absence of suction by a user. Suction by a user at the end of the drinking straw will increase the value of $\Delta p$, increasing the flow rate of infusion fluid $\dot{Q}$ into the inner cavity, and providing a better contact between the infusion fluid and the ingredient to be infused, resulting in a flavorful infusion.

The orifice length L is determined by the thickness of the infuser walls. Preferably, this thickness is between 0.3 mm and 1 mm.

The aforementioned values of L and R allow for values of $\dot{Q}$ that will be small in the absence of suction by the user, but sufficiently large to ensure a flavorful beverage when a user is suctioning at the mouthpiece.

When the ingredient to be infused is yerba mate, this results in a system able to emulate the traditional way of brewing the mate, but without the need of any manual labor and advantageously avoiding direct contact with yerba mate while brewing.

In an embodiment of the infuser of the present invention, the cylindrical surface of the infuser is divided into three sections, wherein each section is either provided with orifices of a given diameter or devoid of orifices. In a preferred embodiment, each of the sections corresponds to the cylindrical surface of the infuser defined by a 120° angle with respect to the cylinder axis. In this embodiment, a first section is provided with orifices having a diameter in the range of 0.3 mm to 0.5 mm, a second section is provided with orifices having a diameter in the range of 1.0 mm to 1.5 mm, preferably 1.2 mm. The infuser further comprises a movable lid, which is configurable to selectively cover the orifices of a given section, or a portion thereof. For example, the movable lid may be configurable to cover a cylindrical surface defined by a 240° angle, i.e. two of the three sections of the infuser can be covered simultaneously while the remaining section is left uncovered, thereby coming in contact with the infusion fluid.

FIGS. 7 to 10 show a movable lid for using in the infuser of the present invention, wherein the lid can be attached to the bottom cover and to a rotating portion of the bottom cover comprising a knob, by which the user can select the position of the movable lid in the infuser.

Figure 11:
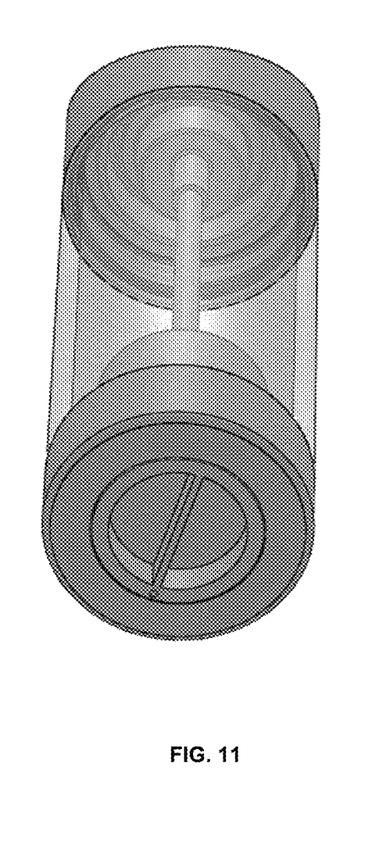
FIG. 11 shows a bottom view of the system for preparing an infused beverage according to an embodiment, wherein the system can be set to "mate/coffee", "tea/water" and "closed" modes.

Using such an infuser, the system of the present invention, as illustrated in FIG. 11, can be configured to operate in three distinct modes:

In the "closed mode", the movable lid of the infuser is set to a position such that all infuser orifices are fully covered. In this manner, the infusion fluid in the bottle is separated from the ingredient to be infused. The user can thus decide at which time the infusion, e.g. tea or mate, will be prepared and consumed using the infusion fluid contained in the bottle, without the need of finding an external source of water.

In the "mate/coffee mode", the movable lid of the infuser is set to a position such that the infuser orifices left uncovered have a diameter of 0.5 mm. As previously described, orifices of this diameter provide a head loss that causes, upon suction from a user at an end of the drinking straw, a flow of infusion fluid into the inner cavity of the infuser at a rate that will ensure a flavorful mate infusion. The obtained yerba mate infusion has a similar flavor to that of a traditionally brewed mate and is not "washed down" after a few sips.

In the "tea/water mode", the movable lid of the infuser is set to a position such that the infuser orifices left uncovered have a diameter of 1.2 mm. Orifices of this diameter provide a decreased head loss as compared to the "mate mode", thereby allowing the infusion fluid to enter into the inner cavity of the infuser at a greater rate. This mode is adapted for tea infusions, which typically need a lower residence time as mate infusions, or for drinking hot or cold water or other fluids, i.e. using the system without an ingredient to be infused.

For the "tea/water mode", orifices may be evenly distributed in the infuser lateral surface. For the "mate/coffee", a single row of orifices may be provided at a bottom portion of the infuser lateral surface, and about five orifices may be provided near an upper portion of the infuser lateral surface such that, if due to their hydration the yerba mate leaves become so swollen that they block the passage of infusion fluid into the infuser though the orifices in the bottom portion, the orifices at the upper portion will still permit the passage of infusion fluid.

The invention claimed is:

1. An infuser comprising:
    a hollow cylinder comprising a plurality of orifices at a cylindrical lateral surface,
    an inner cavity for containing an ingredient to be infused,
    an opening in a top surface for attaching a drinking straw,
    a filter element for separating the ingredient to be infused from the drinking straw,
    a threaded bottom portion for attaching a bottom cover.

2. The infuser of claim 1, wherein the diameter of the orifices is between 0.3 mm and 1.5 mm.

3. The infuser of claim 2, wherein the ratio of the number of orifices to the diameter of each orifice is in the range of 60 to 650 $mm^{-1}$.

4. The infuser of claim 1, wherein the ingredient to be infused is yerba mate or coffee and the diameter of the orifices is between 0.3 mm and 0.7 mm.

5. The infuser of claim 1, wherein the ingredient to be infused is tea and the diameter of the orifices is between 1.0 mm and 1.5 mm.

6. The infuser of claim 1, further comprising three sections defined by an angle of 120°, wherein a first section has orifices of a diameter between 0.3 mm and 0.5 mm, a second section has orifices of a diameter between 1.3 mm and 1.5 mm and a third section is devoid of orifices and a movable lid for selectively covering two of the first, second and third sections.

7. A system for preparing an infused beverage, the system comprising:
    an infuser as set forth in claim 1,
    a double-walled cylindrical container, the infuser being located in a bottom portion of the container,
    a top cover comprising a mouthpiece attached to an upper end of the cylindrical container,
    a drinking straw attached to the opening of the infuser, the straw being in fluid communication with the mouthpiece,
    a bottom cover attached to the threaded bottom portion of the container.

* * * * *